United States Patent Office 3,016,452
Patented Jan. 9, 1962

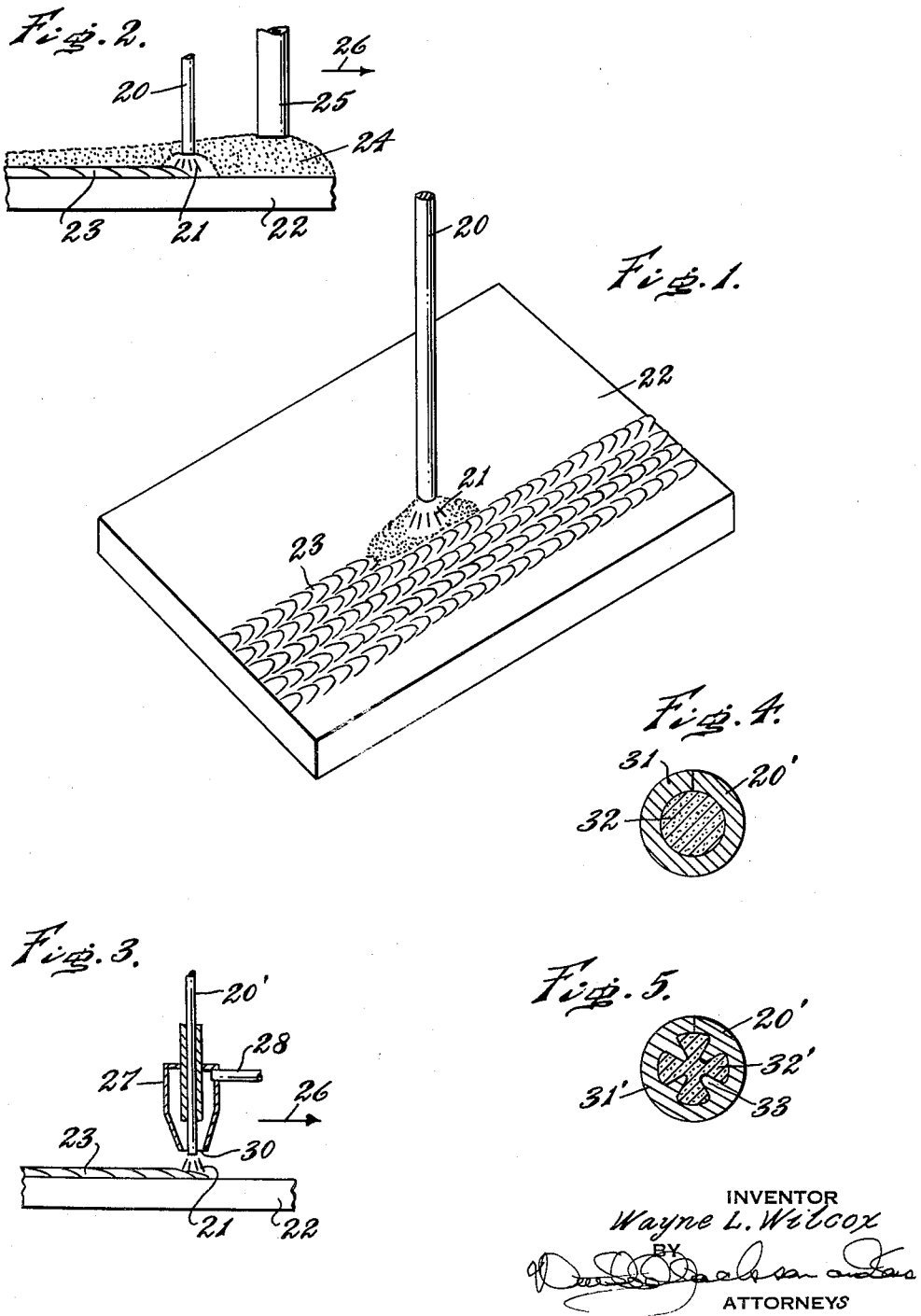

3,016,452
OVERLAY WELDING ELECTRODE
Wayne L. Wilcox, Havertown, Pa., assignor to Arcos Corporation, Philadelphia, Pa., a corporation of Pennsylvania
Filed Jan. 16, 1961, Ser. No. 82,762
2 Claims. (Cl. 219—146)

The present invention relates to electric arc welding electrodes for depositing type 316 and 317 stainless steel deposits on steel work.

A purpose of the invention is to obtain high quality overlay welds of type 316 and 317 stainless steel on plain carbon steel and low alloy steel work.

A further purpose is to avoid cracking in type 316 and 317 stainless steel overlay welding on plain carbon and low alloy steel, especially at the point where the overlay welding joins the base metal.

A further purpose is to accurately control the retained ferrite in the overlay by an improved analysis of electrode, which, with the resulting dilution will secure a percentage of retained ferrite which will be adequate but not excessive.

A further purpose is to reduce the cost and difficulty of producing an overlay welding electrode which will deposit type 316 and 317 stainless steel by utilizing a type 304 envelope and incorporating alloys in the proper proportion in the core.

Further purposes appear in the specification and in the claims.

In the drawings I have chosen to illustrate mechanisms which are useful in applying the invention.

FIGURE 1 is a fragmentary diagrammatical perspective of an overlay weld being formed using the electrode of the invention.

FIGURE 2 is a fragmentary diagrammatic vertical section of submerged arc welding using the electrode of the invention.

FIGURE 3 is a fragmentary diagrammatic vertical section of the use of the electrode of the invention to weld in an atmosphere of protective gas.

FIGURE 4 is a diagrammatic transverse section of one form of welding electrode according to the invention.

FIGURE 5 is a diagrammatic transverse section of another form of welding electrode according to the invention.

Describing in illustration but not in limitation and referring to the drawings:

Considerable difficulty has been encountered in the prior art in obtaining sound overlay welded deposits of type 316 and type 317 stainless steel on plain carbon and low alloy steel base metals. Such overlay welding is normally carried on to make tanks, retorts, pressure vessels and the like.

Type 316 stainless steel has the following analysis:

| | |
|---|---|
| Carbon | 0.08% maximum. |
| Chromium | 16.00 to 18.00%. |
| Nickel | 10.00 to 14.00%. |
| Molybdenum | 2.00 to 3.00%. |

Type 317 stainless steel has the following analysis:

| | |
|---|---|
| Carbon | 0.08% maximum. |
| Chromium | 18.00 to 20.00%. |
| Nickel | 11.00 to 15.00%. |
| Molybdenum | 3.00 to 4.00%. |

One of the difficulties has been in obtaining sound welds which are free from under-bead cracking. Another difficulty has been in holding an analysis in the weld-bead of the first overlay pass and the second overlay pass which is within the type 316 and the type 317 analysis range.

There is no available standard wire composition having the analysis of type 316 or type 317 stainless steel. If such a wire analysis existed it would be unsuitable to deposit type 316 or type 317 stainless steel in view of the dilution of the base metal or work, which is usually mild steel such as AISI 1030 or low alloy steel such as AISI 8620, or 4320 in any case containing less than 3 percent of total alloy by weight. Type 310 stainless steel electrodes are available but they are not satisfactory as they lay down a weld-bead which is fully austenitic and likely to give a poor result from the standpoint of under-bead cracking. Furthermore, this will not produce the required type 316 or type 317 analysis.

Type 310 Mo stainless steel electrodes are available but they are objectionable for the present purpose because it is uncertain whether the weld bead will be austenitic or not, and therefore no reliance can be placed on the condition of the weld.

Type 312 stainless steel welding electrodes are available but are undesirable for the present purpose because they produce a deposit which is rather highly ferritic. This has the disadvantage that the brittle sigma phase may form in the heat-affected zones of neighboring weld beads. Also this electrode contains more carbon than is desired and does not produce an analysis corresponding to type 316 or 317 stainless steel.

There is no existing prior art welding electrode which will produce the desired result.

The present invention involves the production of an electrode which will have the following advantages:

(1) Under the dilution encountered in commercial submerged arc welding or in commercial protected gas atmosphere welding, the electrode of the invention will reliably produce weld beads in first and second passes in overlay welding on plain carbon mild steel and low alloy mild steel analyses which weld beads are within the range of type 316 or type 317 stainless steel.

(2) The ferrite present will be precisely controlled within a limit of 25 to 40 percent by weight and this will result in controlling under-bead cracking of the overlay.

The welding electrode according to the invention is composed of an envelope of type 304 stainless steel which has the following analysis by weight:

| | |
|---|---|
| Carbon | .08 percent maximum. |
| Manganese | 2.00 percent maximum. |
| Silicon | 1.00 percent maximum. |
| Chromium | 18.00 to 20.00 percent. |
| Nickel | 8.00 to 11.00 percent. |

The sheath or envelope will make from 39 to 70 percent by weight of the total metallic composition of the electrode and preferably about 53 percent of the total metallic composition of the electrode. Within the sheath is a core which consists of powder components, preferably in a size range below 40 mesh per linear inch and most desirably below 100 mesh per linear inch.

The core includes between 19 and 33 percent by weight of the total metallic composition of the electrode of powdered ferrochromium (70 percent chromium). The preferred quantity of ferrochromium is 28 percent by weight.

A typical analysis of the ferrochromium used is as follows:

| | |
|---|---|
| Chromium | 67–72 percent. |
| Carbon | 0.11 percent maximum. |
| Silicon | 1.50 percent maximum. |
| Sulfur | 0.10 percent maximum. |
| Phosphorus | 0.10 percent maximum. |

The core also includes from 7 to 20 percent of the total metallic composition of the electrode and preferably 14 percent of nickel powder. A typical analysis of the nickel powder is as follows:

Nickel _____ 98 percent maximum.
Sulfur _____ 0.06 percent maximum.

The core also includes between 8 and 14 percent and preferably 5 percent of the total metallic composition of the electrode of ferromolybdenum powder (60% molybdenum). A typical analysis of the ferromolybdenum is as follows:

Molybdenum _____ 55 to 70 percent.
Carbon _____ 0.15 percent maximum.
Silicon _____ 3.00 percent maximum.
Iron _____ Balance.

It will be evident that if ferrochromium of a different chromium content is used, or if chromium metal is used, or if ferromolybdenum of a different molybdenum content is used, or if metallic molybdenum is used instead of the materials set forth above, the percentages will be accordingly adjusted so that the same quantities of chromium or molybdenum as the case may be will be available.

The nitrogen is limited to 0.10 percent maximum and preferably 0.05 percent maximum by weight of the metallic components in order to give effective control of the ferrite content.

The reason for controlling the chromium accurately as described is that by dilution with the plain carbon or low alloy steel base metal of mild steel carbon range (not exceeding 0.40% carbon by weight) a chromium content in the weld bead within the type 316 or type 317 stainless steel range will be obtained.

The nickel range is controlled because of the desire to have the proper nickel content after dilution and the desire to retain a substantial ferrite content in the weld bead to restrict crack formation.

The molybdenum content is set so that it will be in the proper range after dilution and will contribute to control of the ferrite. The molybdenum of course is helpful in obtaining proper corrosion resistance.

In the drawings I illustrate a welding electrode 20 according to the invention which is maintaining an electric arc at 21 to the work 22 which consists of a mild steel plate of a plain carbon steel analysis such as AISI 1020, 1030 or 1035 or a low alloy steel analysis such AISI 4130, 8620 or 8420. Overlay weld-beads 23 are deposited in succession on the surface of the work having an analysis within the range of type 316 or type 317 stainless steel. The dilution from the plate is of the order of 25 to 40% and the extra alloy composition in the welding electrode compensates for the dilution. Sound weld-beads are deposited containing 5 to 15% of retained ferrite.

The welding may be conducted to use alternating current or direct current of straight or reversed polarity suitably at 20 to 45 volts and from 200 to 900 amperes.

FIGURE 2 illustrates a submerged arc welding setup, submerged arc welding flux 24 being deposited through feed tube 25 which is moving ahead of the electrode in the direction of the arrow 26. The arc 21 in this case is submerged beneath the flux 24. The flux composition will suitably have a maximum and minimum preferred range as follows:

Zirconium silicate between 50 and 1250 mesh, 5 to 75% by weight preferably 10 to 25% and most desirably about 20%.
Lime 0 to 50%
Limestone 5 to 15%
Silica 5 to 10%
Alkali or alkaline earth fluoride, such as fluorspar or cryolite, 2 to 12%
Ferroalloy such as ferrochromium, ferromanganese or ferrosilicon, 2 to 8%

The above flux is described in Johnson and Campbell application, Serial No. 708,110, filed January 10, 1958, now Patent No. 2,955,193, for Welding With Self Removing Flux.

In the case of submerged arc welding the electrode 20 need not contain any flux ingredients.

The invention is also applicable to protected gas welding as shown in FIGURE 3, where the electrode 20' is fed by suitable feed mechanism to the exposed arc 21 through a welding head 27 which receives a protecting gas through pipe 28. The protecting gas may suitably be carbon dioxide, helium, or argon, and is discharged at 30 to protect the arc with inert gas.

The electrode of the invention has a suitable cross-section as shown diagramatically in FIGURES 4 and 5 consisting of a metallic envelope or sheath 31 of type 304 stainless steel and a core 32 as shown in FIGURE 4, the envelope in this case being of uniform cross-section. An envelope 31' may also be used having intruding fins of metal 33 according to Danhier U.S. patent application Serial No. 635,239, filed January 22, 1957, now Patent No. 2,951,937, for Automatic Arc Welding Process, Equipment and Electrode, the fins extending into the core 32'.

The core 32 or 32' as already explained is composed of alloying ingredients.

In using the exposed arc with gas protection the core will also include flux, and the flux ingredients will include fluxing ingredients to the extent of 24 to 42 percent of the weight of the metallic shell or envelope. The core flux composition may be entirely slag-forming materials or it may contain dioxidizers in the proportion of 75 to 96 percent by weight of slag-forming ingredients and 4 to 20 percent of dioxidizer such as ferromanganese. A specific example is:

Low carbon ferromanganese (containing 80 percent manganese), 12 percent by weight.
Slag-forming mixture 88 percent by weight.

The slag-forming materials of the core are composed of 60 to 85 percent by weight of titanium oxide, 4 to 20 percent by weight of manganese monoxide, 8 to 25 percent by weight of silica, the balance consisting mainly of ferrous oxide, alumina, lime, magnesia and alkalies.

A specific composition for the slag-forming mixture will preferably be:

| | Percent |
|---|---|
| Titania | 66 |
| Silica | 19 |
| Manganese oxide plus alumina, plus lime, plus magnesia, plus sodium oxide, plus potassium oxide | 9 |

The above flux core is described in Danhier U.S. patent application, Serial No. 635,239, filed January 22, 1957, for Automatic Arc Welding Process, Equipment and Electrode.

All percentages are by weight.

In view of my invention and disclosure variations and modifications to meet individual whim or particular need will doubtless become evident to others skilled in the art, to obtain all or part of the benefits of my invention, without copying the electrode shown, and I, therefore, claim all such insofar as they fall within the reasonable spirit and scope of my claims.

Having thus described my invention what I claim as new and desire to secure by Letters Patent is:

1. An electric arc welding electrode for overlay deposition of type 316 and type 317 stainless steel, which consists of from 39 to 70 percent of the metallic composition of the electrode of an envelope of type 304 stainless steel, and a core within said envelope having the following analysis in percentage by weight of the metallic composition of the electrode:

| | Percent |
|---|---|
| Ferrochrome, 70% chromium | 19 to 33 |
| Nickel | 7 to 20 |
| Ferromolybdenum, 60% molybdenum | 4 to 8 | and in which the nitrogen content is 0.10% maximum.

2. An electrode of claim 1, in which the envelope is 53% of the total metallic composition of the electrode, and the core includes 28% ferrochrome (70% chromium), 14% nickel and 5% ferromolybdenum (60% molybdenum), of the total weight of the metallic composition of the electrode.

References Cited in the file of this patent

UNITED STATES PATENTS

| 1,893,160 | Clarke | Jan. 3, 1933 |
| 2,408,620 | Friedlander | Oct. 1, 1946 |